United States Patent
Wach

(10) Patent No.: US 6,199,673 B1
(45) Date of Patent: Mar. 13, 2001

(54) SILENT DAMPER WITH ANTI-RATTLE SHAFT

(75) Inventor: Joe Wach, Ingleside, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/177,029

(22) Filed: Oct. 22, 1998

(51) Int. Cl.$^7$ .......................................... F16F 9/36
(52) U.S. Cl. ................... 188/322.18; 188/322.15; 188/322.22; 267/64.12; 267/120
(58) Field of Search .................. 188/322.22, 322.13, 188/322.15, 322.16, 322.18, 281, 288, 322.17; 267/64.12, 120, 124, 129; 277/435, 916

(56) References Cited

U.S. PATENT DOCUMENTS

| | | | |
|---|---|---|---|
| 4,323,224 | * 4/1982 | Freitag et al. | 267/124 |
| 4,433,759 | * 2/1984 | Ichinose | 188/282 |
| 4,548,389 | * 10/1985 | Smith et al. | 188/322.16 |
| 4,630,857 | 12/1986 | Zweiniger et al. | 296/37.12 |
| 4,669,893 | 6/1987 | Chalaire et al. | 384/99 |
| 4,786,098 | 11/1988 | Jobmann et al. | 296/37.12 |
| 4,877,115 | 10/1989 | Bauer et al. | 188/322.15 |
| 4,989,700 | 2/1991 | Popjoy | 188/322.18 |
| 5,655,634 | 8/1997 | Grundei et al. | 188/322.18 |
| 5,697,477 | 12/1997 | Hiramoto et al. | 188/322.18 |
| 5,702,091 | * 12/1997 | Perrin et al. | 188/288 |
| 5,730,263 | 3/1998 | Grundei et al. | 188/322.18 |
| 5,797,593 | * 8/1998 | Oyaizu | 267/64.12 |
| 5,884,734 | * 3/1999 | Hiramoto et al. | 188/322.18 |
| 5,887,857 | * 3/1999 | Perrin | 267/124 |

* cited by examiner

Primary Examiner—Robert J. Oberleitner
Assistant Examiner—Mariano Sy
(74) Attorney, Agent, or Firm—Pitney, Hardin, Kipp & Szuch LLP

(57) ABSTRACT

The damper includes a housing assembly and a piston assembly with reciprocates within the cylindrical walls of the housing assembly. The piston assembly is formed from two disks which are spaced apart by a spacer with includes radially and longitudinally oriented planar projections which extend to a position radially inward of a periphery of the disks. The distal ends of the projections form longitudinally oriented surfaces upon which a toroidal seal slidably rides. At least one of the longitudinally oriented surfaces includes an air communication groove in communication with a groove on the trailing disk which extends to the periphery of the trailing disk. When the piston assembly is retracted from the housing assembly, the seal engages the leading disk thereby inhibiting air from flowing through the air communication groove thereby effectuating damping. However, when the piston assembly is inserted into the housing assembly, the seal engages the trailing disk thereby allowing air to flow through the air communication groove thereby eliminating or minimizing damping. The cap of the housing is formed by portions of elastic O-rings which extend across the mouth of the housing slidably retaining the piston shaft.

7 Claims, 3 Drawing Sheets

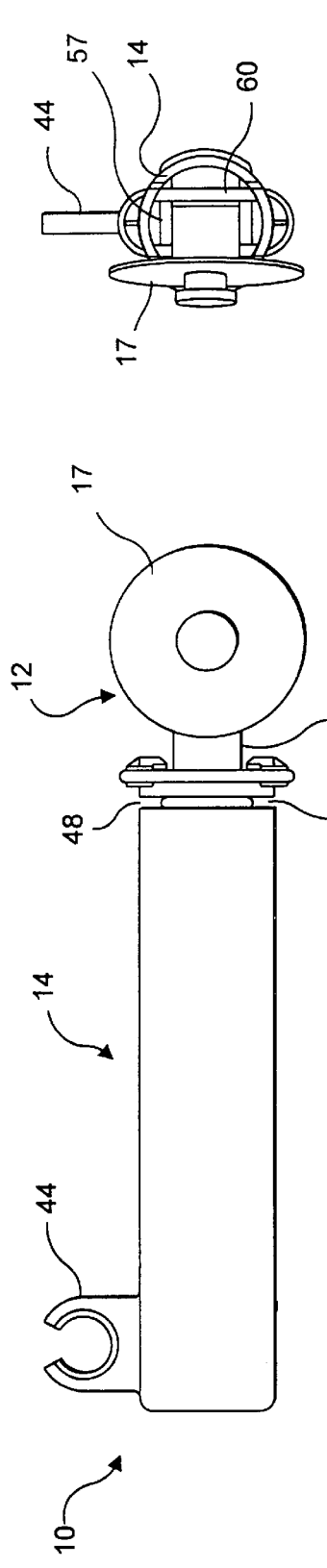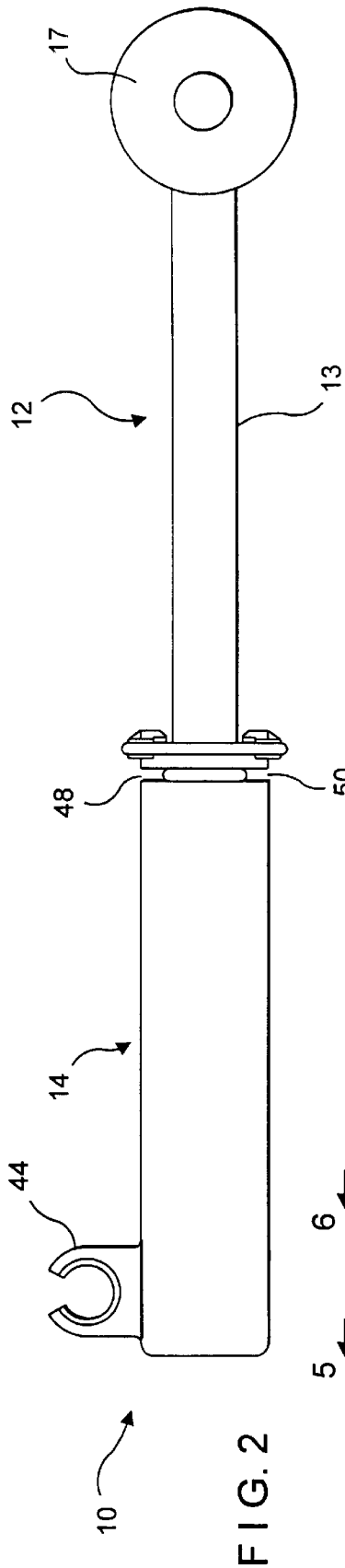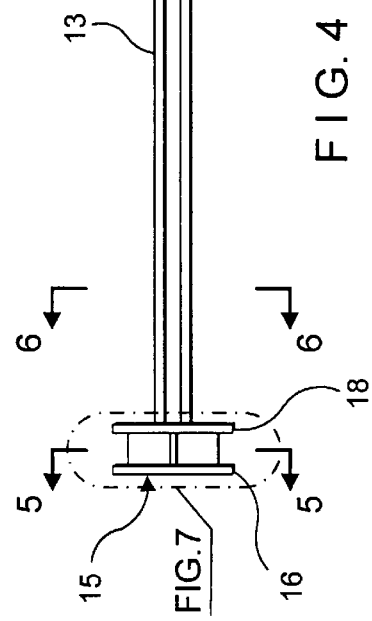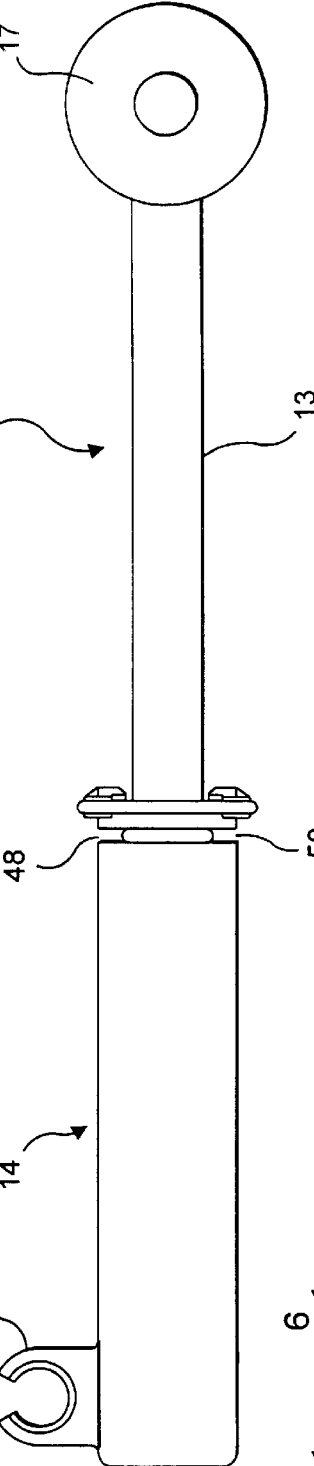

SILENT DAMPER WITH ANTI-RATTLE SHAFT

BACKGROUND OF THE INVENTION

1. Field of the Invention

This invention pertains to a silent damper with directionally dependent damping, and with a self-adjusting O-ring cap for eliminating or minimizing rattle. A typical application for such a damper would be for use with an automotive glove box.

2. Description of the Prior Art

In the prior art, it is known to provide a damper, such as for use with an automobile glovebox, which has directionally dependent damping which is varied by the degree of air or fluid communication between the opposite sides of a reciprocating piston. An example of such a damper is disclosed in U.S. Pat. No. 5,697,477, entitled "Air Damper" issued on Dec. 16, 1997 to Hiramoto et al. in which an O-ring within the piston assembly moves dependent upon the direction of travel of the piston thereby changing the damping strength. Additionally, this reference discloses ridges cut into the side of the cylinder and a cylinder of varying diameter to vary the damping dependent upon the location of the piston within the cylinder. However, as the O-ring travels over a circular disk-type support, the movement of the O-ring can have unwanted resistance, roughness and noise. The O-ring can even bind in such a configuration.

Additionally, the cap of the damper disclosed in the Hiramoto reference is substantially inelastic and therefore is susceptible to rattle and does not provide for any rotation of the piston shaft which is of rectangular cross section. Moreover, a damper with such a cap does not compensate for misalignment of the glovebox or allow for a simple adjustment from a right-hand part to a left-hand part.

Other references in this field include U.S. Pat. No. 5,730,263 to Grundei et al.; U.S. Pat. No. 5,655,634 to Grundei et al.; U.S. Pat. No. 4,989,700 to Popjoy; U.S. Pat. No. 4,877,115 to Bauer et al.; U.S. Pat. No. 4,786,098 to Jobmann et al; U.S. Pat. No. 4,669,893 to Chalaire et al.; and U.S. Pat. No. 4,630,857 to Zweiniger et al.

OBJECTS AND SUMMARY OF THE INVENTION

It is therefore an object of this invention to provide a damper, for automotive glovebox or similar applications, which has a damping strength which is dependent upon the direction of travel of the piston.

It is therefore a further object of this invention to provide a damper, for automotive glovebox or similar applications, which has reduced frictional resistance in the movement of the components associated with the directionally dependent damping strength.

It is therefore a still further object of this invention to provide a damper, for automotive glovebox or similar applications, which has increased smoothness in the movement of the components associated with the directionally dependent damping strength.

It is therefore a still further object of this invention to provide a damper, for automotive glovebox or similar applications, which has a decreased tendency for binding in the movement of the components associated with the directionally dependent damping strength.

It is therefore a still further object of this invention to provide a damper, for automotive glovebox or similar applications, which has a decreased tendency to rattle, particularly the piston shaft against the cylinder or cylinder cap.

It is therefore a still further object of this invention to provide a damper, for automotive glovebox or similar applications, which can be easily adjusted from a right-hand part to a left-hand part, and vice versa.

It is therefore a still further object of this invention to provide a damper, for automotive glovebox or similar applications, which allows for the misalignment of the damper and the twisting of the piston shaft, particularly piston shafts of other than circular cross section.

These and other objects are attained by providing a damper with a piston formed by two disks separated by a spacer, the spacer being formed of longitudinally and radially extending planar portions with an X-shaped cross section. At least one of the distal ends of the planar portions of the spacer includes a groove which forms and air passageway. The groove extends to the periphery of the trailing disk of the piston. The groove may extend to a periphery of the leading disk of the piston but to a lesser depth. A seal rides on the distal ends of the planar portions of the spacer. When the piston is withdrawn from the damper, the seal engages the leading disk of the piston thereby sealing inhibiting air passage between the piston shaft and the inner diameter of the damper. This dampens the rate at which the shaft is pulled out. However, when the piston is inserted into the damper, the seal slides back to engage the trailing disk of the piston thereby allowing air passage through the groove and minimizing damping.

As the seal travels on the distal ends of longitudinally and radially extending planar portions from the damping position to the position with reduced or eliminated damping, frictional resistance, noise and binding are reduced.

Additionally, the cap of the damper is formed from two O-rings. A first O-ring generally engages the periphery of the damper housing and passes through two grooves within periphery of the damper housing so that portions of the O-ring form a first pair of parallel chords within the circular cross section of the damper housing. A second O-ring is engaged by two opposed hooks on the mouth of the damper housing so as to form a second pair of parallel chords within the circular cross section of the damper housing. The second pair of parallel chords is oriented ninety degrees with respect to the first pair of parallel chords. The rectangular intersection of the two pairs of parallel chords formed by the O-rings supports the piston shaft of rectangular cross section. The resulting elastic configuration of the O-rings compensates for misalignment of the damper. Additionally, this elastic configuration allows a user or installer to simply rotate the piston by 180° within the damper housing in order to convert from a left-hand part to a right-hand part, and vice versa.

BRIEF DESCRIPTION OF THE DRAWINGS

Further objects and advantages of the invention will become apparent from the following description and claims, and from the accompanying drawings, wherein:

FIG. 1 is a side plan view of the damper of the present invention in the retracted position.

FIG. 2 is a side plan view of the damper of the present invention in the extended position.

FIG. 3 is a front plan view of the damper of the present invention.

FIG. 4 is a side plan view of the piston assembly of the present invention.

DETAILED DESCRIPTION OF THE PREFERRED EMBODIMENT

Figure 5:
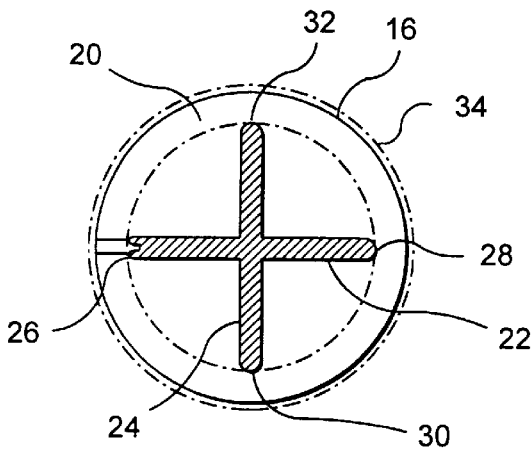
FIG. 5 is a cross-sectional view along plane 5—5 in FIG. 4, with the seal shown in phantom.

Referring now to the drawings in detail wherein like numerals refer to like elements throughout the several views, one sees that FIGS. 1 and 2 are side plan views of the damper 10 of the present invention with the piston assembly 12 in the retracted and extended positions, respectively, in relation to the damper housing 14.

Figure 6:
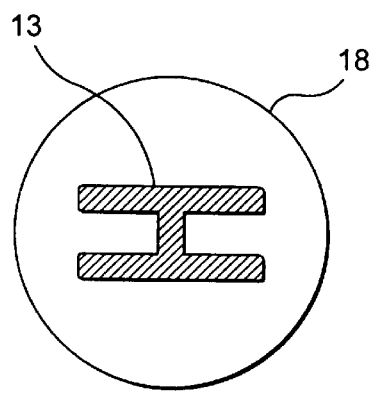
FIG. 6 is a cross-sectional view along plane 6—6 in FIG. 4.
Figure 7:
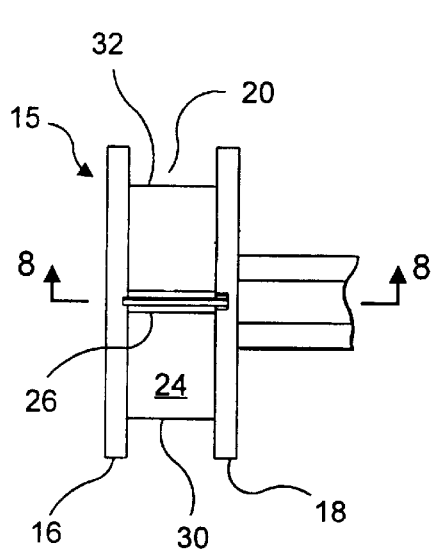
FIG. 7 is a detailed view of the piston of the damper of the present invention.

Piston assembly 12 is shown in detail in FIGS. 4–8. As shown in FIG. 4, piston assembly 12 includes piston shaft 13 attached to piston 15. As shown in FIG. 6, piston shaft 13 is of an H-shaped or generally rectangular cross section. As shown in FIGS. 1 and 2, piston shaft 13 is further attached to head 17 for detent engaging a structural device, such as an automotive glovebox door (not shown). Piston 15 includes a leading disk 16 separated from a trailing disk 18 by a spacer configuration 20. Spacer configuration 20, as shown in FIG. 5, includes planar portions 22, 24 which are oriented in a longitudinal and radial direction in a X cross section. Planar portions 22, 24 include distal ends 26, 28 and 30, 32, respectively which terminate inwardly adjacent from the periphery of leading disk 16 and trailing disk 18. Toroidal seal 34, with outwardly extending lip 35, is positioned between leading disk 16 and trailing disk 18. As shown in phantom in FIG. 5, toroidal seal 34 has an inner diameter to engage and travel upon distal ends 26, 28, 30, 32 (see FIG. 8 wherein toroidal seal 34 is shown in phantom at the two extremes of the range of travel thereof). Lip 35 of toroidal seal 34 has an outer diameter greater than that of leading and trailing disks 16, 18 so as to sealing engage the interior of damper housing 14. Leading and trailing disks 16, 18 preferably do not form a sealing engagement with the interior of damper housing 14.

Figure 8:
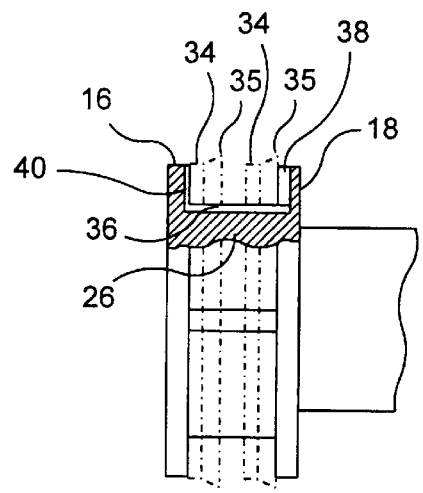
FIG. 8 is a cross-sectional view along plane 8—8 in FIG. 7, showing the air communication groove of the present invention, showing the two positions of the seal in phantom.
Figure 9:
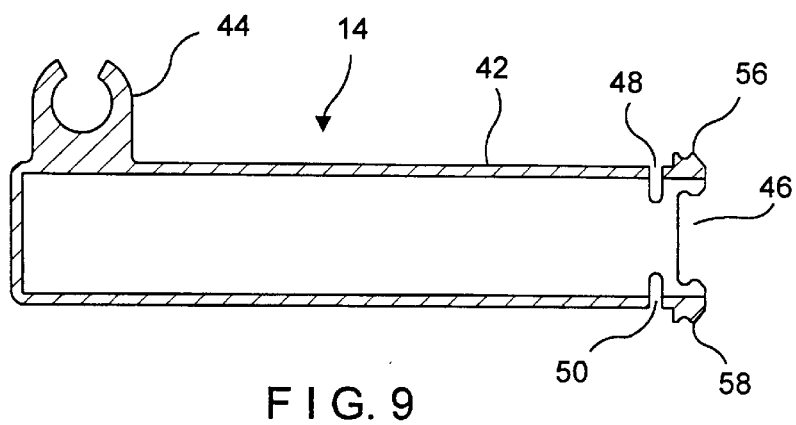
FIG. 9 is a side cross-sectional view of the housing of the damper of the present invention.
Figure 10:
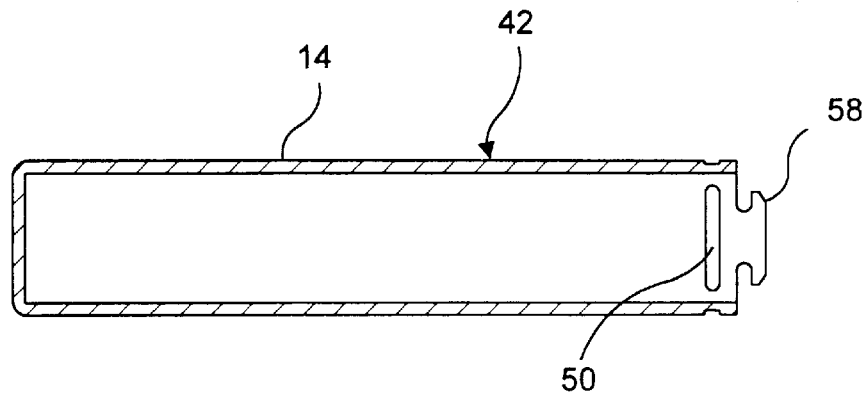
FIG. 10 is a top cross-sectional view of the housing of the damper of the present invention.

As shown in FIG. 8, a radially outward facing portion of distal end 26 further includes selective air communication groove 36. While the illustrated embodiment includes selective air communication groove 36 on a single distal end 26, groove 36 could be included on multiple distal ends. Selective air communication groove 36 is in communication with groove 38 cut into trailing disk 18, extending from selective air communication groove 36 to a peripheral edge of trailing disk 18. Selective air communication groove 36 may also be in communication with reduced air communication groove 40. Reduced air communication groove 40 is cut into leading disk 16, extending from selective air communication groove 36 to a peripheral edge of leading disk 16. In order to achieve the directionally dependent damping, reduced air communication groove 36 must be of less depth (or at least reduced cross sectional area with attendant increased air flow resistance) with respect to groove 38 and selective air communication groove 36. Indeed, reduced air communication groove 40 may even be eliminated in order to achieve the greatest directional dependence of the damping.

When piston assembly 12 is withdrawn from damper housing 14, toroidal seal 34 slides to the leftward position against leading disk 16 as shown in FIG. 8. This allows air communication from the inner diameter of damper housing 14 to piston shaft 13 only through reduced air communication groove 40 and selective air communication groove 36. The increased air flow resistance of reduced air communication groove 40 provides increased damping in this position. Damping in this position can be increased by reducing the depth of reduced air communication groove 40 or even eliminating reduced air communication groove 40.

When piston assembly 12 is inserted into damper housing 14, however, toroidal seal 34 slides to the rightward position against trailing disk 18 as shown in FIG. 8. This allows air communication from the inner diameter of damper housing 14 to piston shaft 13 through selective air communication groove 36 and groove 38. This air communication eliminates or substantially reduces damping in this position of toroidal seal 34.

Figure 11:
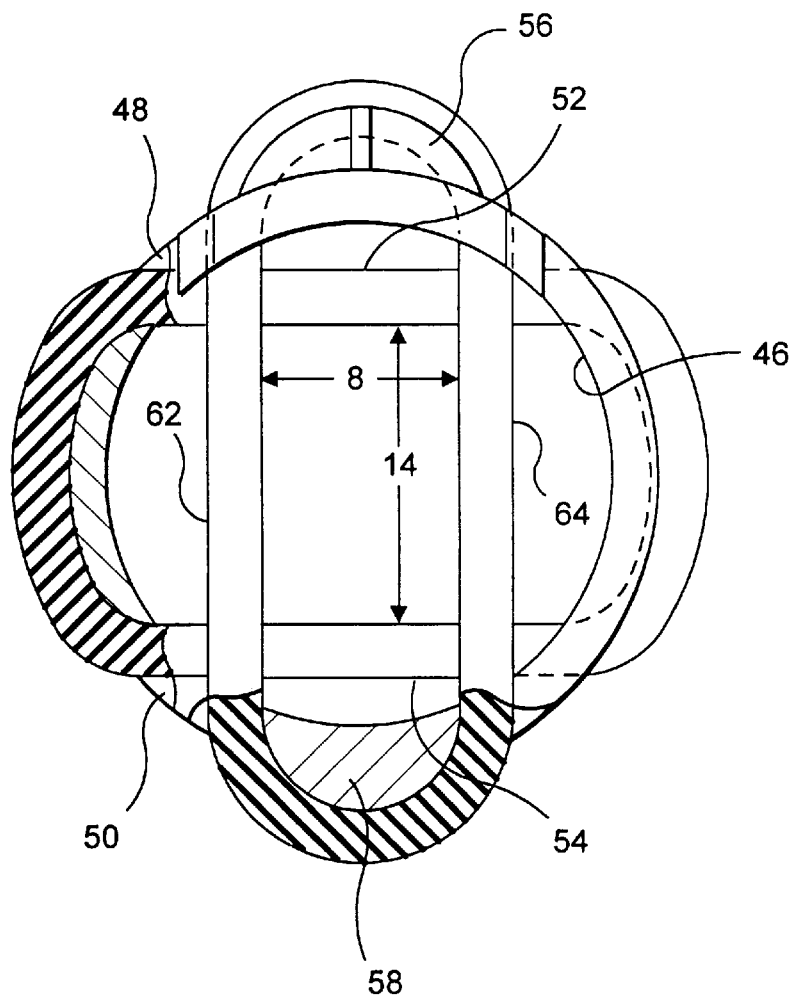
FIG. 11 is a front view of the O-ring configuration of the cap of the damper of the present invention.

Referring now to FIGS. 1, 2, 9 and 10, one sees that damper housing 14 has cylindrical walls 42 and includes semi-circular fastener 44 for engaging a structural device, such as an automotive dashboard (not shown). Mouth 46 is an opening formed by cylindrical walls 42. Inwardly adjacent from mouth 46 are two opposed grooves 48, 50 cut across a chord of the periphery of cylindrical walls 42. As shown in FIGS. 4 and 11, first elastic O-ring 51 extends around portions of the periphery of cylindrical walls 42 and through opposed grooves 48, 50 thereby forming two straight portions 52, 54 for support of piston shaft 13. Likewise, immediately outward adjacent from opposed grooves 48, 50 are outwardly flanged hooks 56, 58, respectively. Second elastic O-ring 60 extends around outwardly flanged hooks 56, 58 thereby forming two straight portions 62, 64 which are perpendicular to straight portions 52, 54. This forms a rectangular area for guiding piston shaft 13 and allowing piston shaft 13 to slide therethrough. This configuration eliminates the necessity for a rigid cap, results in a configuration with very low noise or rattle, and further compensates for subsequent misalignment of piston shaft 13 with damper body 14 without binding. Additionally, this allows the installer to rotate piston shaft by 180° in order to reverse the orientation of head 17 from a right-hand configuration to a left-hand configuration and vice versa.

Grooves 48, 50 and outwardly flanged hooks 56, 58 can be replaced with many similar protrusions or intrusions which can engage an O-ring as will be apparent to those skilled in the art.

While the steps for installation may be done in different orders, a typical order of installation would be that the damper 10 would be provided as an assembled device with the piston assembly 12 inserted into damper housing 14, first O-ring 51 passing through grooves 48, 50 and second O-ring 60 engaged by outwardly flanged hooks 56, 58 thereby slidably retaining piston shaft 13 (otherwise the installer would perform such assembly). The installer would twist piston shaft 13, if necessary, so that head 17 would have the correct orientation. The installer would then engage fastener 44 to a structural device, such as an automotive dashboard (not shown) and engage head 17 to another structural device, such as an automotive glovebox (not shown).

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A damper comprising:

a housing with cylindrical walls;

a piston assembly reciprocating within said housing, said piston assembly including a piston shaft with a first end and a second end, and a piston attached to said first end of said piston shaft, said piston being formed from a leading disk and a trailing disk offset by a spacer;

said spacer comprising projections forming longitudinally oriented surfaces inwardly from a periphery of said leading disk and said trailing disk;

at least one of said longitudinally oriented surfaces including a first groove;

said trailing disk including a second groove extending from said first groove to a periphery of said trailing disk; and a toroidal seal with an inner surface slidably engaging said longitudinally oriented surfaces and an outer surface slidably engaging an interior of said cylindrical walls of said housing, whereby when said piston assembly is extended from said housing, said toroidal seal is urged toward said leading disk thereby inhibiting airflow through said first groove thereby damping movement of said piston assembly and wherein when piston assembly is driven into said housing, said toroidal seal is urged toward said trailing disk thereby allowing airflow through said first groove and said second groove thereby reducing damping of movement of piston assembly;

wherein said leading disk and said trailing disk are free of sealing engagement with said interior of said cylindrical walls of said housing and wherein said outer surface of said toroidal seal sealingly and slidably engages said interior of said cylindrical walls of said housing;

wherein said projections extend along a portion of a radius of said leading disk and said trailing disk; and further including a third groove in said leading disk, said third groove extending from said first groove to a periphery of said leading disk, said third groove having air flow resistance greater than an air flow resistance of said second groove.

2. The damper of claim 1 wherein said toroidal seal has an outwardly extending lip sealingly and slidingly engaging the interior of said cylindrical walls.

3. The damper of claim 2 wherein said second end of said piston shaft includes a detent engagement device.

4. The damper of claim 3 wherein said housing includes a fastener on an exterior of said cylindrical walls.

5. The damper of claim 1 further wherein said cylindrical housing includes an open end and a sealed end, and wherein said open end includes means for holding portions of at least one elastic ring across said open end to slidably retain said piston shaft.

6. A damper comprising:

a housing with cylindrical walls, an open end, and a closed end;

a piston assembly reciprocating within said housing, said piston assembly including a piston shaft with a first end extending through said open end of said housing;

first means for holding portions of at least a first elastic ring across said open end to slidably retain said piston shaft, said first means for holding including two peripherally opposed grooves cut into said cylindrical walls inwardly adjacent from said open end, said at least a first elastic ring engaged by said two peripherally opposed grooves;

second means for holding portions of at least a second elastic ring across said open end to slidably retain said piston shaft; and wherein said portions of at least a first elastic ring are perpendicular to said portions of at least a second elastic ring thereby bounding a rectangular area through which said piston shaft is slidably retained.

7. The damper of claim 6 wherein said second means for holding includes hooks outwardly adjacent from said peripherally opposed grooves.

* * * * *